United States Patent [19]
Luebbe, Jr.

[11] 3,748,034
[45] July 24, 1973

[54] MANIFOLD IMAGING MACHINE
[75] Inventor: Ray H. Luebbe, Jr., Rochester, N.Y.
[73] Assignee: Xerox Corporation, Stamford, Conn.
[22] Filed: Jan. 6, 1971
[21] Appl. No.: 104,340

[52] U.S. Cl............... 355/3, 355/16, 93/1 R, 96/1.3, 346/74 ES
[51] Int. Cl............................................. G03g 15/00
[58] Field of Search ............... 355/3, 16, 17, 12; 96/1 R, 1 A, 1.3, 1.2; 346/74 ES

[56] References Cited
UNITED STATES PATENTS
3,615,393  10/1971  Krohn et al............... 96/1.3

Primary Examiner—Robert P. Greiner
Attorney—James J. Ralabate, David C. Petre and Raymond C. Loyer

[57] ABSTRACT
An apparatus is disclosed for use in the manifold imaging process wherein a rotatably mounted drum shaped electrode is contacted by an electrically photosensitive imaging layer residing on a substrate. The substrate is directed in a predetermined path bringing the electrode and the imaging layer into contact during the rotation of the drum. During rotation an electrical device places an electrical potential across the imaging layer while an optical arrangement permits exposure of the imaging layer to imagewise pattern of electromagnetic radiation to which the imaging layer is sensitive either before or while in contact with the rotatable electrode. Subsequent to exposure the substrate is separated from the rotatable electrode whereupon the imaging layer fractures in imagewise configuration conforming to the imagewise exposure of the imaging layer providing a positive image on one of the substrates and electrodes and a negative image on the other. The image residing on the rotatable electrode is removed and the electrode is rotated to receive additional imaging layer for the production of additional copies.

12 Claims, 1 Drawing Figure

Patented July 24, 1973
3,748,034
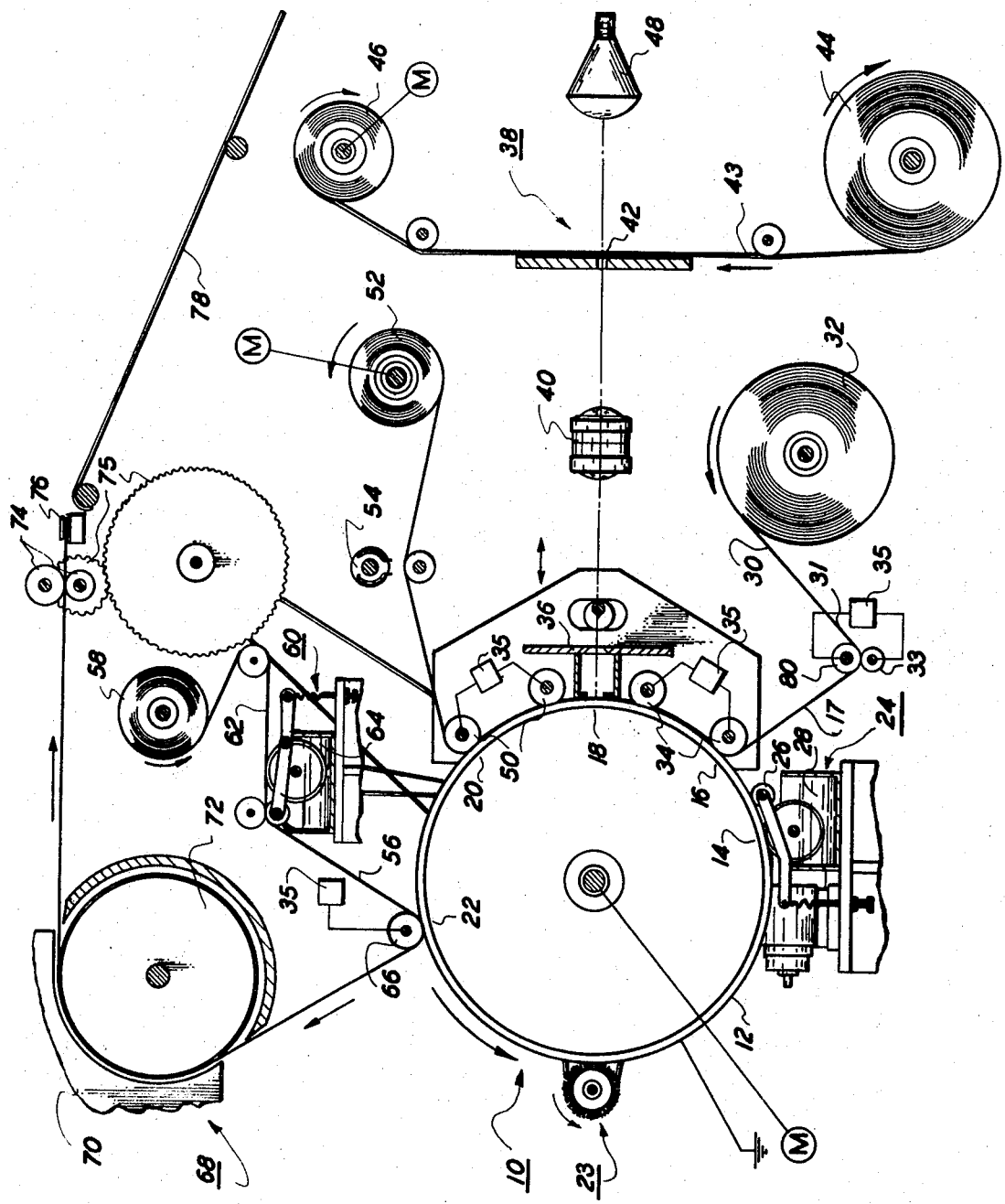
INVENTOR.
RAY H. LUEBBE, JR.
BY
Raymond C. Loyer
ATTORNEY

3,748,034

MANIFOLD IMAGING MACHINE

BACKGROUND OF THE INVENTION

This invention relates to manifold imaging and particularly to an apparatus for automatically and continuously reproducing images by means of the manifold imaging process.

There has been developed an imaging process utilizing a manifold sandwich comprising an electrically photosensitive imaging layer between a pair of sheets. In this imaging system, an imaging layer is prepared by coating a layer of electrically photosensitive material onto a substrate. In one form, the imaging layer comprises a photosensitive material such as metal-free phthalocyanine dispersed in a cohesively weak insulating binder. This coated substrate is called the donor. When needed, the imaging layer is rendered cohesively weak. The process step of weakening the imaging layer is termed activation and in most cases the imaging layer is activated by contacting it with a swelling agent, softening agent, solvent or partial solvent for the imaging layer. This step is not necessary, of course, if the layer is sufficiently cohesively weak to fracture in response to the electromagnetic radiation, normally visible light and an electrical field. In the manifold process, the imaging layer is contacted with a receiver and an electric potential is applied across the thus formed manifold sandwich. Normally, while the potential is applied across the manifold sandwich the imaging layer is exposed to a pattern of electromagnetic radiation to which the imaging layer is sensitive. Upon separation of the donor substrate or sheet and the receiver sheet, the imaging layer fractures along the lines defined by the pattern to which the imaging layer has been exposed. A negative image of the pattern resides on one of the sheets while a positive image of the pattern resides on the other sheet. That is, a duplicate of an original is produced on one sheet while a negative image is produced on the other. Various electrically photosensitive materials will give varying locations of the image sense.

Previously, the manifold sandwich has been employed with flat plate electrodes which provide electrical potential across the manifold sandwich. Such flat plate electrodes are cumbersome and require discontinuous operative procedures to effect imagewise exposure and development by separation of the donor and receiver sheets. Other means for producing images in the manifold imaging process have been employed which rely upon the use of insulating substrates for at least one of the donor and receiver sheets. While this eliminated the inconvenience of employing a flat plate transparent electrode, the substrate upon which the final image produced was to reside was limited to those materials which could be suitably employed in the process which was based upon the use of static charges in insulating sheets. The apparatus and machines heretofore developed for use in the manifold imaging process have been manual in operation and relatively time consuming.

SUMMARY OF THE INVENTION

Accordingly, it is an object of this invention to provide a manifold imaging machine or apparatus capable of operating to produce a completed manifold image in a very short period of time as, for example, in one second or less after the original exposure.

It is a further object of this invention to provide an apparatus with means for the exposure of the electrically photosensitive imaging layer while the layer is moving and in contact with a rotating receiver.

Another object of this invention is to provide a manifold imaging apparatus which automatically transfers a manifold image from a rotating electrode to an image substrate of choice to provide a final usable image copy.

Another object of this invention is to provide a rotating reusable receiver substrate in the manifold imaging process.

Still another object of this invention is to provide a manifold imaging apparatus which provides conveniently a choice of automatically producing either a positive or a negative image on the final image substrate.

Additional objects of the invention will be understood from the following specification and from the drawings in which FIG. 1 is a side view of a preferred form of the apparatus of this invention.

Referring more particularly to FIG. 1, a manifold imaging machine generally designated 10 consists of a rotatably mounted drum shaped electrode 12 the surface of which provides a receiver sheet in the manifold imaging process. Around the electrode 12 are stations of various stages of operation for the manifold imaging processes. These stations include an optional activator applicator station 14, donor contact station 16, exposure station 18, donor separation station 20 and image removal station 22. Preferably, there is positioned after the removal station an electrode cleaning means 23 to remove any residual image material which may not have been removed at the image removal station.

In operation electrode 12 is rotated by drive means not shown in the direction shown in FIG. 1 to provide both an electrode whereby an electric field across the manifold sandwich can be provided and the receiver sheet portion of the manifold sandwich. Although many electrical configurations can be employed, FIG. 1 shows electrode 12 as being a grounded electrode in the manifold process.

In those instances in the manifold process wherein the electrically photosensitive imaging layer must be weakened by the application thereto of an activator, there is provided activator application means 24 which can comprise many different applicator devices. The application shown in FIG. 1 consists of smooth or rough surfaces roller 26, loaded to provide firm contact with electrode 12 and positioned such that its path of rotation passes thorough a bath of activator fluid 28 wherein it picks up activator fluid on its surface to be transported to the surface of electrode 12. Other liquid applicator means such as brushes, flow coaters, vapor condensation, sprayers and the like can be employed in substitution for the roller shown in FIG. 1.

Wetted electrode 12 travels in its path of rotation to donor contact station 16 where it comes into contact with the imaging layer residing on donor web 30 being fed from supply roll 32 forwarded by drive means not shown. Donor web 30 can alternatively be in the form of cut sheets with appropriate forwarding means provided. Donor web 30 has coated on its surface facing rotating electrode 12 an electrically photosensitive material which when contacted by the activator is rendered cohesively weak or, in other words, structurally fracturable in response to the combined effects of electromagnetic radiation to which it is sensitive and an electric field which is below the electrical breakdown potential of the manifold sandwich as will be more fully described below. Optionally, at least one pressure means is employed to ensure firm contact between donor web 30 and rotating electrode 12. FIG. 1 illustrates the use of a plurality of pressure rolls 34 and 50. Depending upon the electrical system employed, pressure rollers 34 and 50 may be biased or insulated and in FIG. 1 they are independently associated with variable power supplies 35.

After contacting rotating electrode 12, donor web 30 carrying the electrically photosensitive imaging layer is moved in conjunction with electrode 12 to exposure station 18 wherein in the preferred embodiment described in FIG. 1, an electric field is applied across the thus formed manifold sandwich of donor web 30, imaging layer 31 and rotating electrode 12 by means of pressure rollers 34. In manifold imaging several alternative charging means as described herein can be employed. The slit corona discharge device 36 is employed with photoelectrophoretic imaging layer on web 30. Such imaging processes are described in U.S. Pat. No. 3,384,488.

Imaging layer 31 is exposed to a pattern of electromagnetic radiation to which it is sensitive through transparent donor web 30 by means of exposure means generally designated 38. Exposure means 38 comprises lens system 40 and aperture 42. The original to be copied is provided in FIG. 1 as a transparent film 43 forwarded by drive means not shown from film supply roll 44 which is taken up on film take up roll 46, although other kinds of original images can be employed. The movement of the transparent film is made synchronous with the rotation of rotatable electrode 12 and donor web 30. Light is supplied by an incandescent lamp 48.

After exposure the donor web continues its path in conjunction with the rotation of rotatable electrode 12 through pressure rolls 50 which can be electrically biased or grounded. The preferred embodiment of FIG. 1 shows pressure rollers 50 to be associated with a variable power supply 35. The uppermost pressure roller 50 provides a breaking point around which donor web 30 is entrained to separate it from rotating electrode 12. Upon separation of donor web 30 from rotatable electrode 12, imagewise fracture of the imaging layer 31 is achieved providing a positive image of the original on one of the donor web and the rotating electrode and a negative image on the other. The donor take up reel 52 takes up the thus used donor web containing the remainder of the electrically photosensitive imaging layer which is not employed to produce an image on rotating electrode 12. Optionally, a charge neutralizing corona discharge device 54 is provided to neutralize any electrical charges in donor web 30 in those instances wherein donor web 30 is electrically insulating.

The image residing on rotating electrode 12 produced by the separation of donor web 30 from the electrode at station 20 is removed from rotating cylinder 12 by transfer web 56 supplied by transfer web supply roll 58. In the preferred embodiment, transfer sheet 56 is first wetted with activator fluid prior to contacting the image on rotating cylinder 12. The activator is supplied to transfer web 56 by means of applicator generally designated 60 which is of similar design to applicators 24 consisting of a spring weighted rotating cylinder 62 which passes through a bath of activator fluid 64 and contacts transfer web 56 dispersing activator fluid thereon.

Although several image transfer systems have been developed for transferring images produced by the manifold imaging process, the preferred embodiment employs the biased transfer roller 66 which presses transfer web 56 into contact with the image residing on rotating electrode 12. Transfer roller 66 can be either charged, grounded or insulated depending upon the transfer method employed and is shown to be associated with variable power supply 35. Due to the electrical charges residing in the imaging material and the proper bias being placed on roller 66, the image is removed electrically from rotating electrode 12 to transfer web 56. The path of travel of transfer web 56 after leaving bias roller 66 is directed through fixing station generally designated 68 comprising cover 70 and heated roller 72 which evaporates the activator fluid and fixes the image to transfer web 56. After fixing transfer web 56 is drawn through nip rollers 74 driven by meshed gears 75 and is cut into convenient lengths by cutter 76 as it rests upon support means 78. After being cut, the severed portion of transfer web 56 is delivered for use from support means 78 by gravity or other suitable means to propel it into the hands of the user.

Alternatively, if it is desired to use the image provided on donor web 30, fixing means, cutting and delivery means as discribed above with respect to transfer web 56 can be employed in place of take up roller 52. Thus, transfer web 56 can be processed as shown in FIG. 1 or can be simply taken up on a take up roller as shown for donor web 30 in FIG. 1. Accordingly, the apparatus of this invention can provide final image copy as continuous or discontinuous portions of donor web 30 or transfer web 56. Likewise, the image on donor web 30 can be transferred in the same manner the image is transferred from electrode 12 by contacting the image with a transfer web.

In another embodiment, imaging layer 31 residing on an electrically insulating donor web 30 can be electrostatically charged by means of charging rollers 80 and exposed to electromagnetic radiation to which it is sensitive at a point in its path of travel prior to reaching donor contacting station 16 such as a point 17 thereby eliminating the need for a transparent donor web 30. The operation of the apparatus of this invention is identical to that described above with the exception of the means for placing an electric field across the imaging layer. In still another embodiment, imaging layer 31 can be exposed either prior to or after being brought into contact with rotating electrode 12 by various image projection means which are designed to synchronously project a stationary image onto a moving surface. In another embodiment, exposure systems 38 can be replaced by the image projection system as disclosed in U.S. Pat. No. 3,062,108 incorporated herein by reference. Such a system projects images from opaque as well as transparent original documents.

The electrical potential across the manifold sandwich formed by donor web 30, imaging layer 31 and rotating electrode 12 can be applied in many ways. When donor web 30 is electrically insulating, static charges can be imposed by contacting the web with an electrically charged electrode such as rollers 80 in FIG. 1 by closing switch 81 to engage power supply 83. Alternatively, the web can be charged using corona discharge devices such as those described in U.S. Pat. Nos. 2,588,699 to Carlson, 2,777,957 to Walkup, 2,885,556 to Gundlach or by using conductive rollers as shown in FIG. 1 and described in U.S. Pat. No. 2,980,834 to Tregay et al or by frictional means as described in U.S. Pat. No. 2,297,691 to Carlson or other suitable apparatus. Thus, the field across the imaging layer can be applied by any of the above means in substitution of the charged roller of FIG. 1. Furthermore, the polarity of the charging device is of little importance in the manifold imaging process and the corona discharge device, charging roller or other means employed can be either positively or negatively charged while rotating electrode 12 is of the opposite charge.

The strength of the electrical potential across the manifold sandwich depends on the structure of the manifold sandwich and the materials used. The potential required may, however, be easily determined. If too large a potential is applied, electrical breakdown of the manifold sandwich will occur allowing arching between rotating electrode 12 and the oppositely charged member. If too little potential is applied, the imaging layer will not fracture in imagewise configuration. The preferred potential across the manifold sandwich is in the range of from about 2000 volts per mil to about 7000 volts per mil of electrically insulating material. Since relatively high potentials are utilized, it is desirable to insert a resistor in the electrical circuit to limit the flow of current. Resistors on the order of about 1 megohm to about 20,000 megohms are conventionally employed.

Rotating electrode 12 comprises one electrode by which the manifold sandwich is subjected to an electrical potential. Thus, rotating electrode 12 is constructed of conductive material but can be covered with a thin layer of electrically insulating material. It is preferred, however, to provide a conductive surface for the imaging layer 31 to contact during the operation of the manifold imaging process.

As stated above, depending on the nature of the electrically photosensitive material employed and the polarity of the electric field across the manifold sandwich during the imagewise exposure step, the positive and negative image produced will reside on either one of the donor web or the rotating electrode due to the distinctive adhesive forces created by the exposure of the imaging layer and the electric field. The respective adhesions of the positive and negative images originally produced can be reversed by providing the apparatus of this invention with capability of modifying the electric field across the imaging layer subsequent to the imagewise exposure of the imaging layer. After the imaging layer is exposed, the electric field is modified by either reversing, grounding or reducing the potential across the manifold sandwich. Thus, by providing means to vary the electrical potential of rotating electrode 12 in addition to means for grounding the rotating electrode, one can employ pressure rollers 34 and 50 as charging rollers associated with variable power supplies 35 in a method designed to reverse the respective adhesions of the positive and negative images. A more deailed description of the image reversal process accomplished by means of modifying the electric potential across the imaging layer subsequent to imagewise exposure can be found in copending application Ser. No. 81,357 filed Oct. 16, 1970.

It has also been found that certain imaging layers respond to reverse biasing without exposure to activating electromagnetic radiation. That is, initially the imaging layer adheres more strongly to the donor sheet than to the receiving sheet; however, by charging the set by applying a field across the layer and then modifying the potential across the layer, the imaging layer is found to adhere more strongly to the receiver sheet than to the donor sheet. It is, therefore, possible to provide a system wherein the manifold sandwich is given a uniform charge and then placed in an imagewise field of opposite polarity. Thus, corona discharge device can be replaced by a charged character wheel or other shaped electrode which is brought in contact with web 30. Upon separation of the donor web 30 from rotating electrode 12, the imaging layer fractures in imagewise configuration providing a positive image on one of the sheets and a negative image on the other. For these imaging layers then, it is not necessary to provide photosensitive pigments dispersed in a binder, instead, pigments not considered photosensitive may be incorporated in the imaging layer. Typical of these pigments are carbon black, iron oxides, lead chromate in paste form designated "alkyd" paste, titanium dioxide, lead chromate and the various pigments used in printing inks and mixtures thereof.

The imaging layer contains any suitable electrically photosensitive material. Typical organic materials include quinacridones such as 2,9-dimethyl quinacridone, carboxamides, such as 8,13-dioxodionaphtho (2,1-2',3-) furan-6-carbox-p-methylanilide, triazines, such as 2,4-diaminotriazine, phthalocyanines such as beta-form metal free phthalocyanine, copper phthalocyanine, tetrachlorocyanine, the "X"-form of metal free phthalocyanine as described in U. S. Pat. No. 3,357,989; metal salts and lakes of azo dyes; inorganic compositions including cadmium sulfide, zinc oxide, zinc sulfide, sulphur, selenium and other organic and inorganic electrically photosensitive materials as described in copending application Ser. No. 708,380, filed Feb. 26, 1968, which is incorporated herein by reference.

The imaging layer usually comprises electrically photosensitive materials described above dispersed as a hetergeneous mixture with electrically insulating binder material. Typical binder materials include microcrystalline waxes, waxes from hydrogenerated oils, polythylenes, modified styrenes and copolymers such as vinyl acetate-ethylene copolymers, all of which are more completely described in the above incorporated copending application, Ser. No. 708,380.

The basic physical property desired in the imaging layer is that it be frangible or structurally fracturable as prepared or after having been suitably activated. That is, the layer must be sufficiently weak structurally so that the application of electrical field combined with the action of actinic radiation on the electrically photosensitive material will fracture the imaging layer. Further, the layer must respond to the application of field the strength of which is below that field strength which will cause electrical breakdown or arcing across the imaging layer. Another term for "cohesively weak," therefore, would be "field fracturable."

Preferably, the imaging layer coated on donor web 30 is structurally strong so as to withstand storage, shipping and handling. In such instances, when the imaging layer is not sufficiently cohesively weak to allow imagewise fracture, it is desirable to include activation means in the apparatus of this invention. The activation means may take many forms as stated above such as applying a substance to the surface of the imaging layer or including a substance in the imaging layer which substance lowers the cohesive strength of the layer or aids in lowering the cohesive strength. Such substances to be included in or on the imaging layer are, for example, thermosolvents which are substances which when heated liquefy and when liquid acts as a solvent or partial solvent for the imaging layer. In such instances, the activator means can be in the form of a drum heating element which melts the thermosolvent. In addition, electrode 12 can be heated and thereby supply any heating required in the imaging process employed.

It is generally preferable that the activator have a relatively low boiling point so that fixing of the resulting image can be accomplished by evaporation of the activator. It is to be understood, however, that the apparatus is usable at higher boiling point non-volative activators as well as low boiling point non-voltive activators. Typical activators include dimethyl polysiloxanes and very high boiling point long chain aliphatic hydrocarbon oils ordinarily used as transformer oils such Wemco-C transformer oil available from the Westinghouse Electric Company. In the case of these less volative activators, the image can be fixed, for example, by contacting the final image with an absorbent sheet such as paper which absorbs the activator fluid. Briefly, any suitable volatile or non-volatile activator may be employed preferably activators including aliphatic hydrocarbon fractions such as Sohio Odorless Solvent 3440 available from the Standard Oil Company and petroleum ether. Other typical activators are described in copending incorporated applicaton Ser. No. 708,380.

The donor web although described herein as a continuous web can be in the form of cut sheets supplied individually for each imaging operation. In whatever form, continuous web or cut sheet, the donor sheet is preferably electrically insulating, however, particularly when rotating electrode 12 is coated with an electrically insulating surface, donor web 30 is electrically conductive. Typical insulating materials include polyethylene, polypropylene, polyethylene terephthalate, paper and various plastic coated papers all of which are more completely described in copending application Ser. No. 708,380. Rotating electrode 12 can comprise any suitable metal such as steel, aluminum or other conductive materials which optionally can be coated with an electrically insulating material such as polyethylene and preferably polyethylene terephthalate.

Image transfer from rotating cylinder 12 to transfer web 56 is accomplished by one of several means preferably by the means disclosed in copending application Ser. No. 886,838 filed Dec. 22, 1969. In said copending application, there is discosed a method of transferring electrically charged insulating image material from an image bearing surface to electrically non-conductive image receiving surfaces by means of coulombic attraction and the rearrangement of electrical charges. Another method is described in copending application Ser. No. 887,805 filed Dec. 24, 1969 which describes the transfer of electrically insulating image material containing a static charge from an electrically conductive image bearing surface to an image receiving surface by means of coulombic attraction and the rearrangement of electrical charges. By suitably arranging the rotating electrode 12 and transfer rollers 66 such as to rearrange the charges, the image is removed from rotating electrode 12 to transfer web 56 without additional potential required. Copending applications Ser. Nos. 886,838 and 887,805 are incorporated herein by reference.

According to a further embodiment of this invention, the mechanism as herein described is adapted for the reproduction of an optical image formed on the face of a cathode ray tube or light source of converted energy. A suitable embodiment of such a mechanism is that disclosed in connection with FIG. 1 wherein the face of the cathode tube is substituted for exposure means 38. Alternatively exposure means 38 can be in the form of a character wheel which has letters in stencil form through which actinic light is projected onto the imaging layer carried by web 30. The apparatus of this invention is uniquely suited to the high speed reproduction of images and linear speeds of over ten inches per second have been attained. These and other advantages will occur to those skilled in the art.

While this invention has been described in preferred form, it must be understood that modifications thereof may be made without departing from the scope of the invention.

What is claimed is:

1. An imaging apparatus wherein an electrically photosensitive imaging layer residing on a web is fractured in imagewise configuration in response to the combined effects of an applied electric field and exposure to electromagnetic radiation to which it is sensitive comprising an opaque rotatably mounted electrode web forwarding means to bring said electrically photosensitive imaging layer synchronously into contact with said electrode over a portion of said electrode sufficient to receive a complete synchronously projected imagewise pattern of said electromagnetic radiation, means to expose said imaging layer to said pattern of electromagnetic radiation while said layer is in contact with said electrode, means to separate said web from said electrode whereby said imaging layer fractures in imagewise configuration providing a positive image on one of said web and electrode and a negative image on the other, said image on said electrode retaining an electrostatic charge, means, including said rotatable electrode, to apply an electric field across said imaging layer during said exposure and separation of said web from said electrode and means to electrostatically remove said image from said electrode.

2. The apparatus of claim 1 further including means to urge said substrate toward said rotatable electrode over a portion of said electrode comprising conductive electrode means associated with an independent power supply whereby the electric field across said imaging layer can be modified subsequent to its exposure.

3. The apparatus of claim 1 further including means for cleaning said rotatably mounted electrode.

4. The apparatus of claim 1 wherein the forwarding means to bring an electrically photosensitive imaging layer into contact with said electrode comprises a web forwarding means including a web feeding roll, at least one pressure roll adapted to urge said web toward said rotatably mounted electrode and a web take-up roll.

5. The apparatus of claim 1 further including means to apply an activator to said imaging layer prior to its separation from said rotatably mounted electrode.

6. The apparatus of claim 1 wherein said means to remove said image from said rotatable electrode comprises a continuous web, a web feeding means, pressure means to press said web against said image on said rotatably mounted electrode said pressure means including at least one biased roller and means to separate said transfer web from said rotatably mounted electrode.

7. The apparatus of claim 6 further including means to apply an activator fluid to said transfer web.

8. The apparatus of claim 6 further including a fixing means to fix said image on said transfer web.

9. An imaging apparatus wherein an electrically photosensitive imaging layer residing on a web is fractured in imagewise configuration in response to the combined effects of an applied electric field and exposure to electromagnetic radiation to which said layer is sensitive comprising an opaque rotatably mounted electrode, forwarding means to bring said imaging layer synchronously into contact with said electrode, means to electrostatically charge said imaging layer in its path of travel prior to contact with said electrode, said rotatable electrode having common potential with one electrode of said charging means whereby an electric field is placed across said imaging layer while it is in contact with said electrode, exposure means to expose said imaging layer to an imagewise pattern of electromagnetic radiation to which said layer is sensitive in its path of travel between said electrostatic charging means and said electrode, means to separate said web from said rotatable electrode whereby said imaging layer fractures in image-wise configuration providing a positive image on one of said web and rotatable electrode and a negative on the other, said image on said rotatable electrode retaining an electrostatic charge, and means to electrostatically remove said image from said electrode.

10. An apparatus of claim 9 wherein the means to apply an electric field across the imaging layer comprises a corona discharge device adapted to deposit an electric charge on said web, said device having a common ground with said electrode.

11. The apparatus of claim 9 further including means to apply an activator to said imaging layer.

12. The apparatus of claim 11 wherein said means to apply comprises a fluid reservoir, a rotatably mounted cylinder adapted to enter and leave said reservoir and to deposit activator fluid on said rotatably mounted electrode in its path of rotation.

* * * * *